(12) United States Patent
Lundback

(10) Patent No.: US 10,167,603 B2
(45) Date of Patent: Jan. 1, 2019

(54) SKIMMING AND SEPARATION DEVICE

(71) Applicant: Surfcleaner AB, Vaxholm (SE)

(72) Inventor: Stig Lundback, Vaxholm (SE)

(73) Assignee: Surfcleaner AB, Vaxholm (SE)

( * ) Notice: Subject to any disclaimer, the term of this patent is extended or adjusted under 35 U.S.C. 154(b) by 308 days.

(21) Appl. No.: 14/783,934

(22) PCT Filed: Apr. 14, 2014

(86) PCT No.: PCT/SE2014/050455
§ 371 (c)(1),
(2) Date: Oct. 12, 2015

(87) PCT Pub. No.: WO2014/168577
PCT Pub. Date: Oct. 16, 2014

(65) Prior Publication Data
US 2016/0053455 A1 Feb. 25, 2016

(30) Foreign Application Priority Data

Apr. 12, 2013 (SE) .................................... 1350469

(51) Int. Cl.
| | |
|---|---|
| *E02B 15/10* | (2006.01) |
| *C02F 1/40* | (2006.01) |
| *B01D 21/30* | (2006.01) |
| *B01D 21/00* | (2006.01) |
| *B01D 21/34* | (2006.01) |
| *B01D 21/24* | (2006.01) |
| *C02F 101/32* | (2006.01) |

(52) U.S. Cl.
CPC ........ *E02B 15/106* (2013.01); *B01D 21/0003* (2013.01); *B01D 21/2411* (2013.01);
(Continued)

(58) Field of Classification Search
CPC .. C02F 1/40; C02F 2201/002; C02F 2101/32; C02F 2209/03; B01D 21/2433; B01D 21/24–21/2427; E02B 15/106
See application file for complete search history.

(56) References Cited

U.S. PATENT DOCUMENTS 3,741,391 A 6/1973 Donsbach
6,458,282 B1 * 10/2002 Lundback .......... B01D 17/0214
210/242.3
(Continued)

FOREIGN PATENT DOCUMENTS

CN 1278312 A 12/2000
CN 1361840 A 7/2002
(Continued)

OTHER PUBLICATIONS

International Search Report for corresponding Patent Application No. PCT/SE2014/050455 dated Aug. 6, 2014.
(Continued)

*Primary Examiner* — David C Mellon
*Assistant Examiner* — Liam Royce
(74) *Attorney, Agent, or Firm* — Renner, Otto, Boisselle, & Sklar LLP

(57) ABSTRACT

A skimming and separation device includes an outer casing (1) having constructions to directly or indirectly fasten all parts, including a number of inflow tubes (20), and defining a closed container (19). The device includes a floater (5) configured to create a skimming function. The floater is attached at its lower side to an essentially vertically arranged bellow (23) allowing the floater to adapt flow into a substantially circum volume that is allowing flow in a downward direction into the inflow tubes (20), which allow debris and floating pollutions to enter below the accumulated debris and floating pollutions to preferably set the internal fluid inside the casing (27) in horizontal circular rotational (Continued)

motion as a result of a power device (7). The power device is controlled by a control unit such that various kinds of flows and pressures may be generated to control the in-flow and out-flow of the device.

10 Claims, 8 Drawing Sheets

(52) U.S. Cl.
CPC ..... *B01D 21/2416* (2013.01); *B01D 21/2427* (2013.01); *B01D 21/2433* (2013.01); *B01D 21/30* (2013.01); *B01D 21/302* (2013.01); *B01D 21/307* (2013.01); *B01D 21/34* (2013.01); *C02F 1/40* (2013.01); *C02F 2101/32* (2013.01); *C02F 2201/002* (2013.01); *C02F 2209/03* (2013.01)

(56) References Cited

U.S. PATENT DOCUMENTS

| | | | | |
|---|---|---|---|---|
| 6,743,358 | B1 * | 6/2004 | Lundback | E02L 315/106 |
| | | | | 210/242.3 |
| 7,807,059 | B2 | 10/2010 | Lundback et al. | |
| 8,083,824 | B2 * | 12/2011 | Fujiyama | B01D 45/12 |
| | | | | 55/337 |
| 2010/0187186 | A1 * | 7/2010 | Howdeshell | B01D 17/0205 |
| | | | | 210/744 |
| 2011/0284479 | A1 * | 11/2011 | O'Brien | C02F 1/002 |
| | | | | 210/764 |

FOREIGN PATENT DOCUMENTS

| | | |
|---|---|---|
| CN | 1752352 A | 3/2006 |
| CN | 2774931 Y | 4/2006 |
| CN | 2846497 Y | 12/2006 |
| CN | 101036843 A | 9/2007 |
| CN | 100577921 C | 1/2010 |
| CN | 201999778 U | 10/2011 |
| CN | 202157315 U | 3/2012 |
| DE | 14 84 845 B1 | 9/1969 |
| GB | 1 062 407 A | 3/1967 |
| WO | 99/22078 A1 | 5/1999 |
| WO | 01/12905 A1 | 2/2001 |
| WO | 02090666 A2 | 11/2002 |

OTHER PUBLICATIONS

Office Action for corresponding Chinese Patent Application No. 201480020842.1 dated Aug. 23, 2016.

* cited by examiner

SKIMMING AND SEPARATION DEVICE

This application is a national phase of International Application No. PCT/SE2014/050455 filed Apr. 14, 2014 and published in the English language.

FIELD OF THE INVENTION

The present invention relates to a skimmer and separation device according to the preambles of the independent claims.

BACKGROUND OF THE INVENTION

The present invention is related to the devices disclosed in U.S. Pat. No. 6,743,358 and U.S. Pat. No. 7,807,059.

U.S. Pat. No. 6,743,358 relates to apparatus for collecting material floating on the surface of a body of water. The apparatus according can be used for collecting different kinds of pollutants, both solid and liquid, floating on the water, but it is particularly devised and suited for collecting oil spilled on a water surface, including oil mixed with solid material. More particularly, the apparatus relates to a skimmer apparatus (skimmer) of the kind adapted to skim a surface layer across a skinning weir of an immersed collection vessel and allow the pollutants to accumulate on the surface of the water in the collection vessel so that they can then be removed in some suitable manner.

WO97/07292 and WO99/22078 disclose prior art embodiments of apparatus of that kind. In this kind of prior art apparatus the collection vessel has a side wall comprising an upper wall part which has some buoyancy and the upper end of which forms the skimming weir, and a lower wall part, the upper wall part being vertically movable relative to the lower wall part. The upper and lower wall parts jointly delimit laterally an upper subcompartment of a collection compartment having an inlet that is formed by the skimming weir. A lower subcompartment of the collection compartment forms an extension of and is in open communication with the upper subcompartment. Water can be fed into and discharged from the collection vessel through an opening in a bottom wall thereof.

In the apparatus disclosed in WO97/07292 the oil is collected on the surface of the water accommodated in the upper subcompartment of the collection compartment. It is discharged from the collection compartment by feeding water from below into the collection compartment to cause the skimming weir to be pressed against an overlying plate having a discharge opening and cause the oil layer on the water surface to be expelled through the discharge opening into a suitable recipient.

In the apparatus disclosed in WO99/22078, the oil is accumulated in a separation compartment that is delimited laterally between a inner wall, which resembles the side wall of the apparatus according to WO97/07292, and an outer wall. The oil enters across the skimming weir of the inner wall and moves downward in the collection compartment delimited by the inner wall. At the lower edge of the inner wall the oil enters the separation compartment where it accumulates on the surface of the water therein. The separation compartment is delimited upward by a top wall with a discharge opening through which the oil can be expelled in the same manner as in the apparatus according to WO97/07292 by feeding water from below into the collection vessel.

An advantage of positioning the separation compartment outside the collection compartment delimited by the inner wall is that the oil flowing outward from that compartment into the separation compartment is distributed horizontally over an area that can readily be made much larger than the horizontal area delimited by the inner wall. Accordingly, the horizontal velocity of the oil in the separation compartment can be very low, thereby allowing the oil to rise substantially without disturbance to the surface in the separation compartment.

Solid objects of various kinds are often carried along by the oil and cause problems when the oil is to be discharged from the separation compartment. In the apparatus according to WO99/22078, such objects have a tendency to collect at the top of the layer of oil in the separation compartment, adjacent the top wall or roof of the collection compartment, and to remain there when the oil is expelled through the discharge opening. As a result, only those objects which are below or close to the discharge opening are carried along with the oil discharged from the separation compartment.

The apparatus according to U.S. Pat. No. 6,743,358 is adapted to float in the body of water carrying the material of lower density to be collected. This material is herein supposed to be oil, possibly mixed with solid objects of one kind or another, such as bottle caps, pieces of plastic, pieces of bark and wood, or other debris. It should be noted, however, that the invention is also advantageously useful for collecting exclusively solid debris, such as leaves or other plant debris floating on the water surface in open-air pools.

A known method for collecting pollutants having a density higher than that of water and carried by a surface layer of a body of water uses a skimmer apparatus, that is, an apparatus by which the surface layer of the body of water is skimmed off into a collection vessel. An example is shown in WO01/12905 A1.

The method is cyclical with each cycle of operation comprising an intake phase and a discharge phase. During the intake phase, the surface layer runs into a collection vessel having a separation compartment with a top wall. The inflow into the collection vessel takes place through an inlet that communicated with the separation compartment. During the intake phase the pollutants entrained by the inflowing surface layer are allowed to collect gravimetrically, that is, by virtue of their lower density, as a layer of pollutants beneath the top wall of the separation compartment. This layer floats on the underlying water in the separation compartment.

During the discharge phase, the layer of pollutants collected beneath the top wall of the separation compartment is dispelled from the separation compartment through a riser outlet by introducing water as a displacing liquid into the separation compartment beneath the layer of pollutants.

As actually used, the skimmer apparatus by means of which the method is implemented operates automatically, the intake and discharge phases being initiated and terminated under control based on sensing the interfaces between the pollutant and water layers in the separation compartment and the riser outlet. According to WO01/12905 A1, the sensing is carried out using ultrasonic sensors, but other types of sensors may also be used. In order that the collection may take place efficiently, the control of the intake and discharge phases must be controlled in a reliable manner and include a possibility to simple adaptation to the conditions existing in each case, such as the amount of heavier particles which are carried by the skimmed surface layer into the collection vessel and settle therein, the composition and viscosity of the pollutants, etc. The pollutants often comprise a mixture of solid and liquid pollutants and may partially have a density higher than that of the water in the skimmed surface layer and partially have a lower density than the water.

Using conventional sensors it is difficult to control the intake and discharge phases reliably in a satisfactory manner. Ultrasonic sensors, for example, may operate in an excellent manner if they are properly set for the layers on which the sound is to be reflected or which the sound is to penetrate, but if the density or sonic transmission properties of the layer should change, the setting of the sensor has to be changed. If particles enter the region of the sensors, the function is affected in an unpredictable manner.

Other sensors which may be contemplated for the detection of the interfaces or density differences between the layer of pollutants and the water carrying the layer suffer for diverse problems which make it difficult to have a satisfactory control of the intake and the discharge in all operating situations.

A further problem is caused by the fact that the skimmed surface layer often contains material that has a higher density than the water of the surface layer but is nevertheless entrained by the surface layer and carried into the collection vessel. In the collection vessel, however, this material may settle because of the low flow velocities which exist, especially in the separation compartment. The settled material may collect on the bottom wall of the separation compartment and gradually load the collection vessel heavily enough to jeopardize the function of the skimmer apparatus.

The problem to be solved by U.S. Pat. No. 7,807,059 is to provide a method of the kind indicated in which the initiation and termination of the intake and discharge phases can be controlled reliably in a satisfactory manner.

In accordance with U.S. Pat. No. 7,807,059, the solution to this problem is based on monitoring the changes of the weight of the collection vessel in the body of water during the operating cycle and initiating the intake and discharge phases in response to the said weight reaching predetermined values. These changes can be monitored in different ways.

One way is to measure the distance between the surface of the body of water and reference point which is fixed relative to the collection vessel and situated above the surface of the body of water. The changes manifest themselves by changes in the depth of immersion of the collection vessel. The distance measurement can be carried out using an echo sounder, for example.

Another way is to directly measure the weight of the collection vessel in the body of water using a load cell.

U.S. Pat. No. 7,807,059 also relates to apparatus for the implementation of the method according to the invention and to a software product which is especially for use in carrying out the method according to U.S. Pat. No. 7,807,059 using a computer and auxiliary means coacting with it. Use of this software product may take place exclusively locally in the collection apparatus using a computer installed therein or via a communication link using a server which is geographically separated from the collection apparatus, such as a server which can be accessed via the Internet.

Thus, the present invention is related to the devices disclosed in U.S. Pat. No. 6,743,358 and U.S. Pat. No. 7,807,059 B2.

The apparatuses disclosed in those patents may be described as skimming and separation apparatus that can be used for collecting different kinds of pollutants, both solid and liquid; floating on the water, but it is particularly devised and suited for collecting oil spilled on a water surface, including oil mixed with solid material. They comprise of a separation and collecting vessel. The collecting compartment includes an upper sub compartment delimited laterally by an inner wall having a skimming weir device forming an inlet to the collection compartment and a lower sub-compartment which is delimited laterally by an outer wall and communicates with a separation and storage compartment and to a bottom outlet. The separation and storage compartment is in its peripheral connection to an outflow compartment with driving means for discharging water there from through a bottom outlet. The inner wall (collecting strut) and the outer wall (outer casing) that generates the separation and storage compartment can accumulate and store floating material. This compartment is in open communication with the inner sub-compartment of the collection compartment. A valve is provided at the top of the separation compartment and when in open position connects the separation compartments with the upper sub compartment of the collection compartment. The valve stays in a closed position during the collection of pollutants due to the under pressure that is generated by the bottom discharge means during the collecting phase. Once the separating and storage compartment is considered to be full enough an emptying phase starts by reversing the flow through the apparatus. The outlet will now become the inlet and pressure will be generated inside the apparatus. The valve will open and the weir skimming device will close to a derbies outlet arrangement.

The collected and stored pollutants in the separating and storage compartment are now supposed to by its flotation forces migrate over to the upper sub compartment of the collection compartment. Once the pollutants is in place hydraulic forces, generated by the bottom driving means will force the pollutants be expelled through the pollution outflow into disposable floating bags or other storing means.

It has been found out that the separation of the above mentioned devices is very good, but that it is very difficult and time consuming to empty the device when high viscosity oils and mixed pollutants are collected.

One object of the present invention is to achieve an improved skimming and separation apparatus that is easier and less time consuming to empty than previously known apparatus, in particular when high viscosity oils and mixed pollutants are collected.

Another object of the present invention is to achieve an improved separation device that is configured for use in a wide range of applications and modes.

SUMMARY OF THE INVENTION

At least the above-mentioned objects are achieved by the present invention according to the independent claims.

The first independent claim, and the dependent claims referring to that claim, relates to the second embodiment, and the second independent claim, and the dependent claims referring to that claim, relates to the first embodiment.

The present invention is based upon studies that have shown that the stated drawback is due to the fact that the collected oil and other debris (pollutants) have to move from an outer periphery to an inner periphery when passively moving to its discharge position. This must result in a radial compression that need more power than the passive flotation forces can generate. By the implementation of the present invention these forces can be increased to suitable levels, and thereby improve the movement from the outer periphery to the inner periphery.

SHORT DESCRIPTION OF THE APPENDED DRAWINGS

FIG. 1 discloses a cross-sectional view of a skimming and separation device according to a first embodiment of the present invention.

FIG. 2 discloses a cross-sectional view of a skimming and separation device during the collection phase, according to the first embodiment.

FIG. 3 discloses a cross-sectional view of a skimming and separation device during the emptying phase, according to the first embodiment.

Figure 4A:
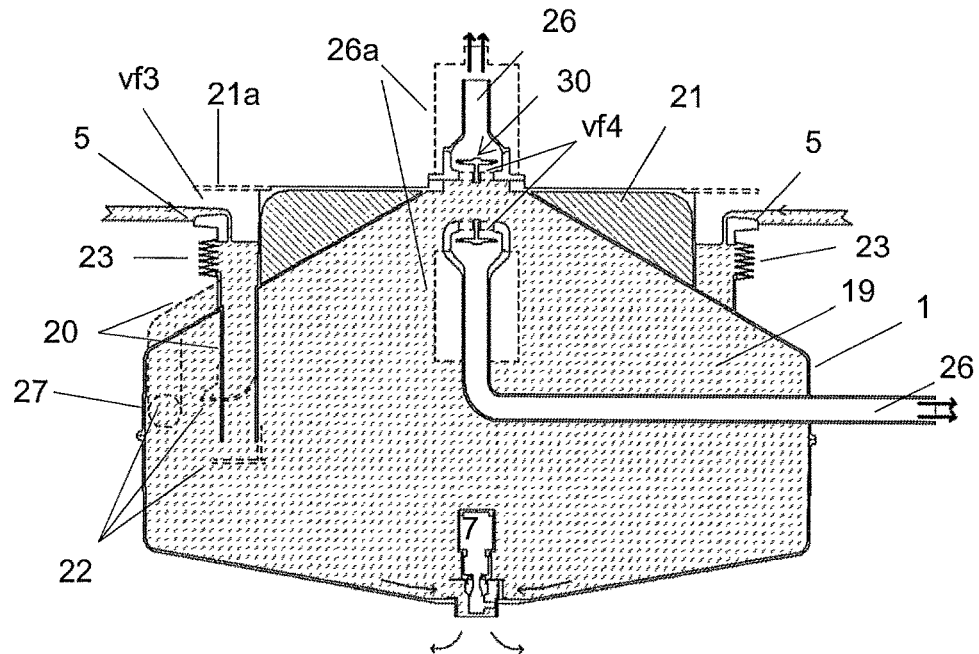
FIG. 4a is a cross-sectional view of a separator device according to the second embodiment.
Figure 4B:
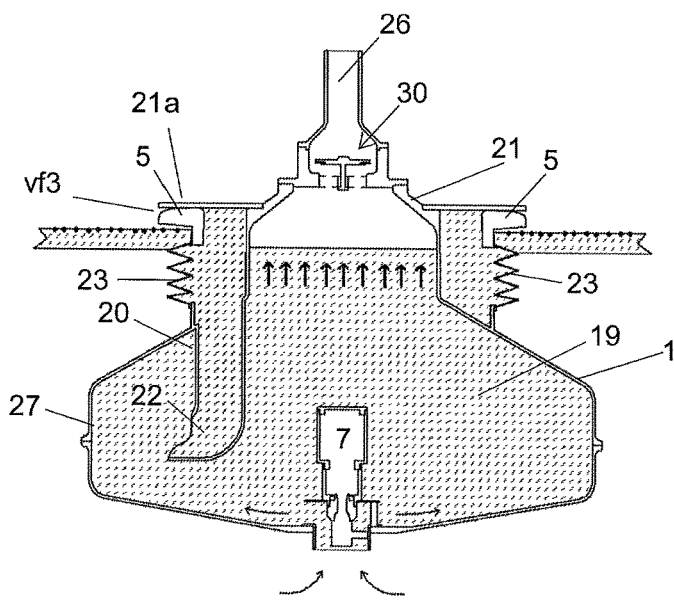
FIG. 4b is a cross-sectional view of a separator device according to the second embodiment, during a preparation phase.
Figure 4C:
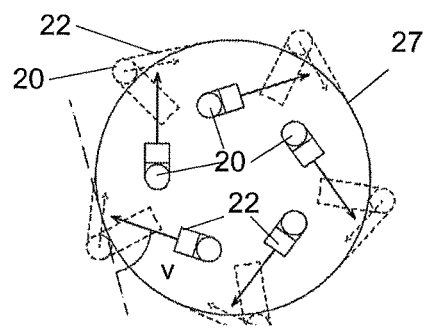

In FIG. 4c is schematically shown a cross-sectional view from above through the lower part of the separation device.

Figure 5:
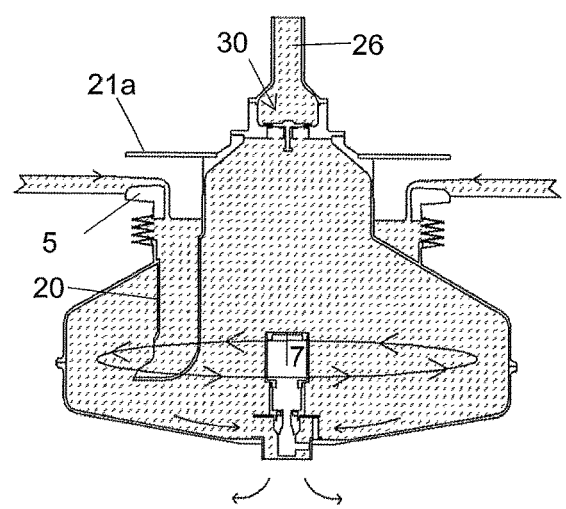

FIG. 5 is a cross-sectional view of a separator device according to the second embodiment, during start of a debris collection phase.

Figure 6:
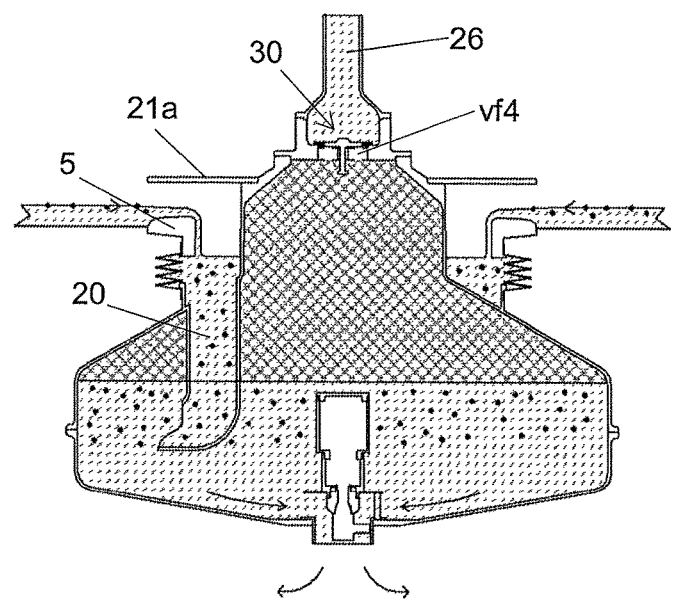

FIG. 6 is a cross-sectional view of a separator device according to the second embodiment, during the debris collection phase.

Figure 7:
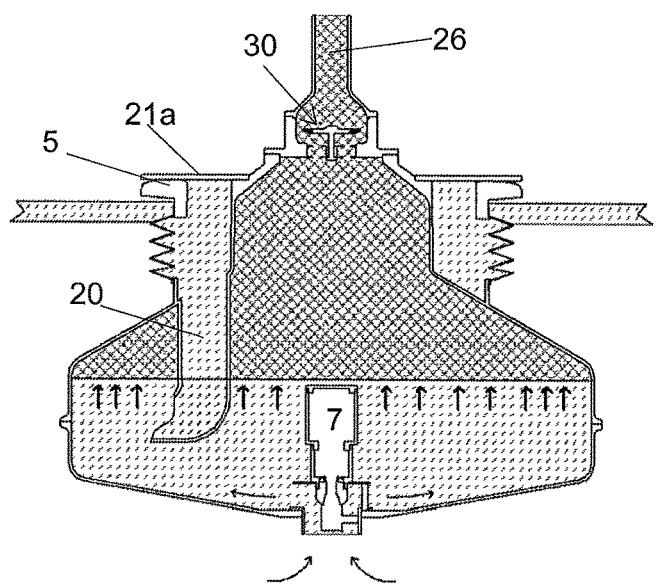

FIG. 7 is a cross-sectional view of a separator device according to the second embodiment, during a debris discharging phase.

Figure 8:
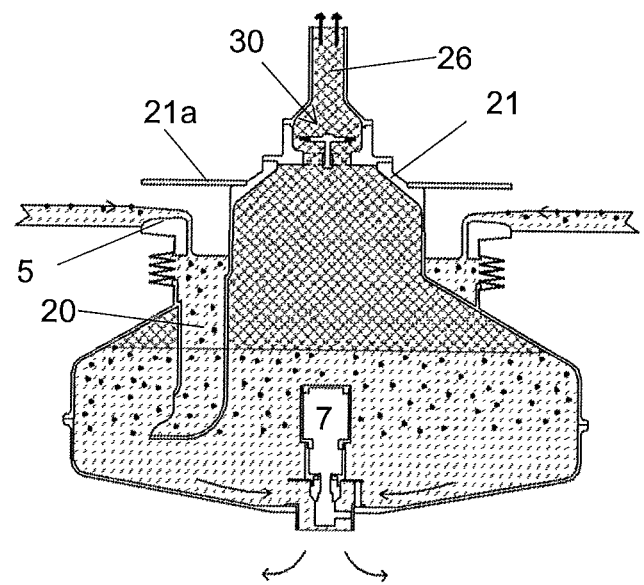

FIG. 8 is a cross-sectional view of a separator device according to the second embodiment, during a combined collection and discharging phase.

Figure 9:
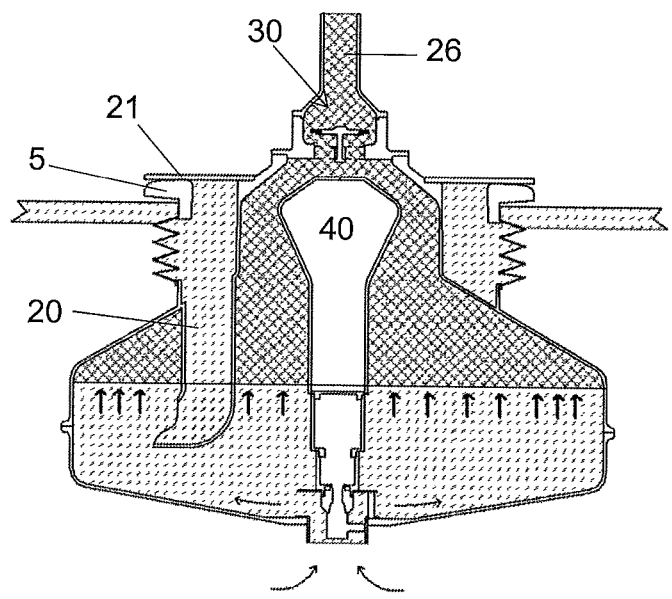

FIG. 9 is a cross-sectional view of a separator device according to a variation of the second embodiment, during the discharging phase.

Figure 10:
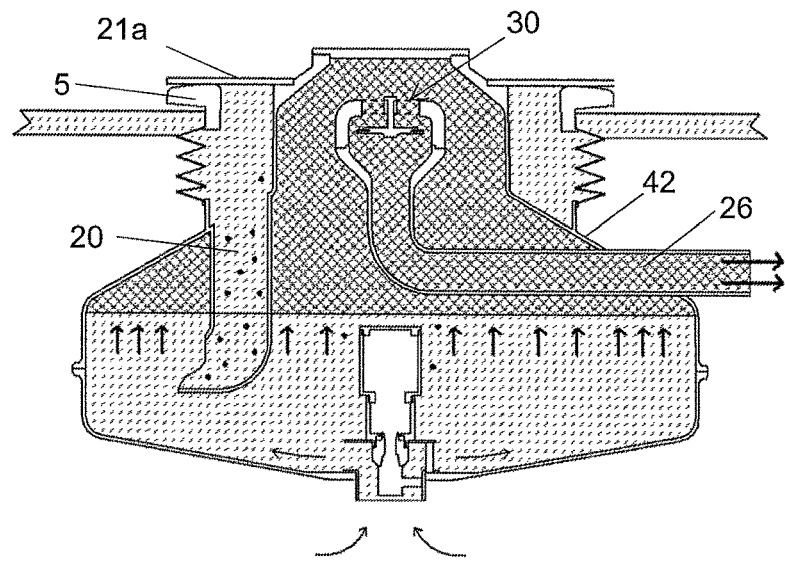

FIG. 10 is a cross-sectional view of a separator device according to another variation of the second embodiment, during the discharging phase.

Figure 11:
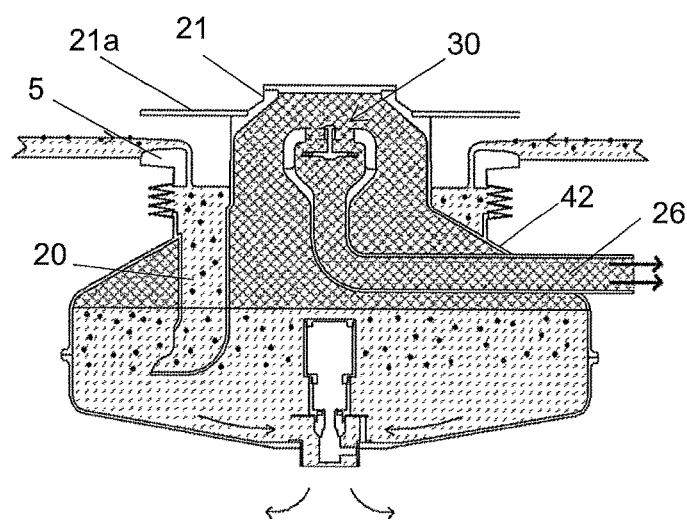

FIG. 11 is a cross-sectional view of a separator device according to still another variation of the second embodiment, during a combined collection and discharging phase.

Figure 12:
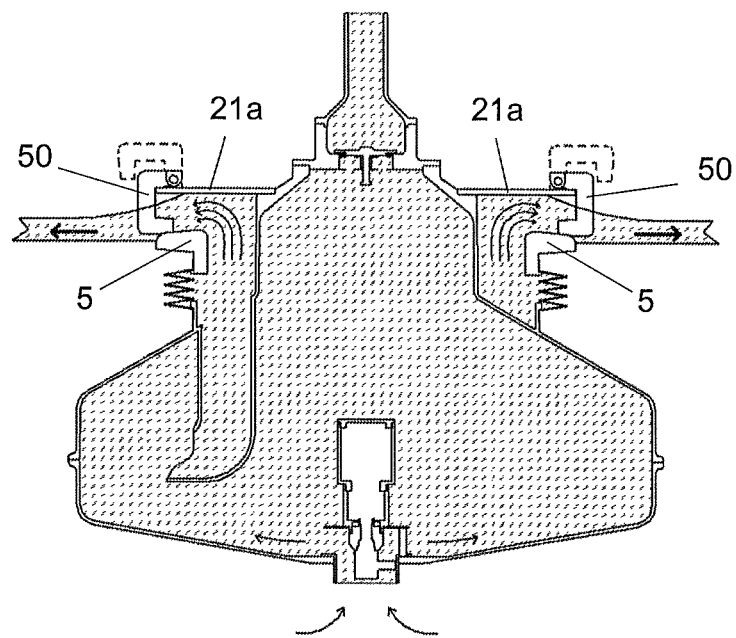
Figure 13:
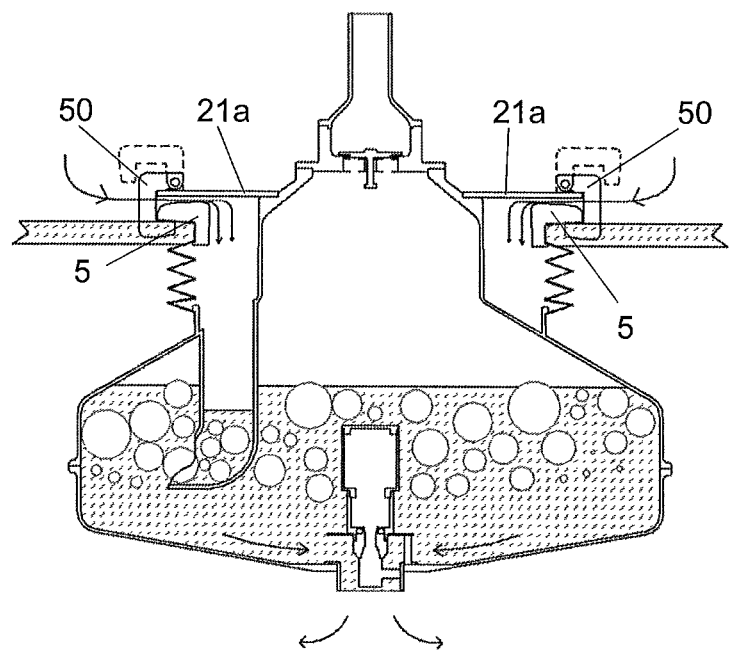

FIGS. 12 and 13 show cross-sectional views of the separation device according to still another variation of the second embodiment.

Figure 14:
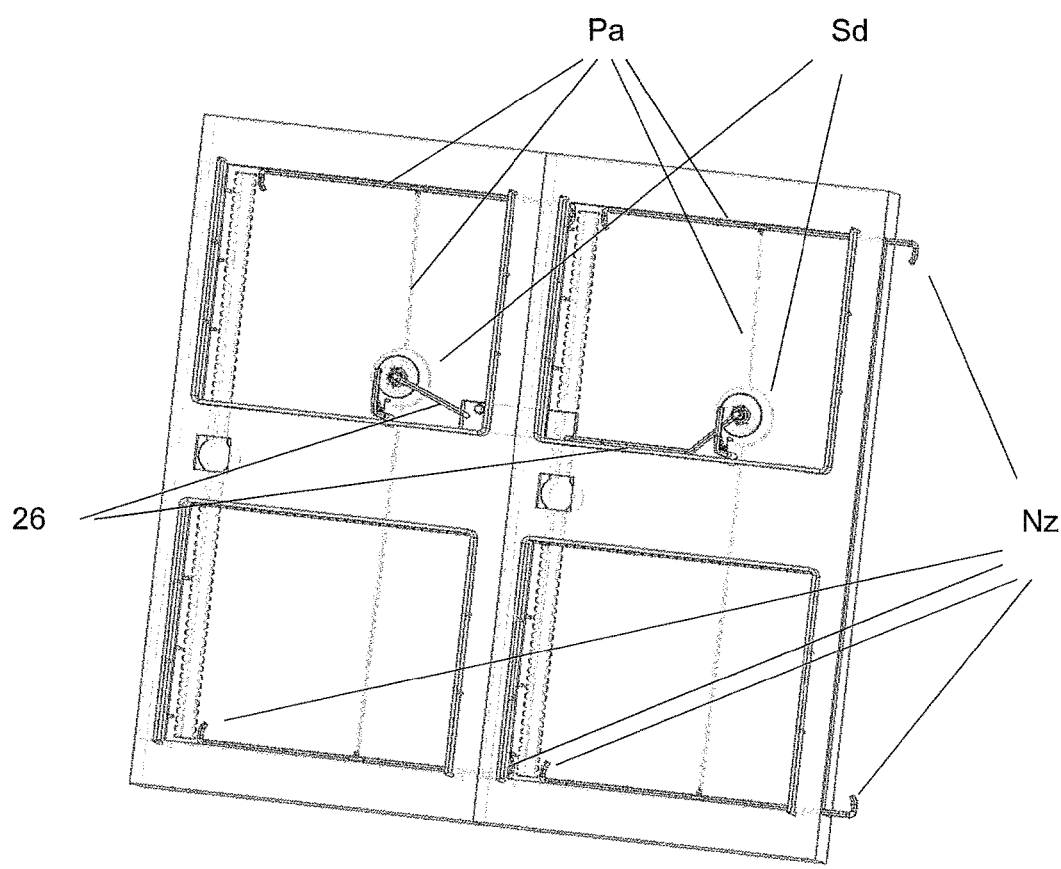

FIG. 14 is a schematic illustration of a waste water purifying plant comprising two separation devices (Sd) according to the first or second embodiment of the present invention.

DETAILED DESCRIPTION OF PREFERRED EMBODIMENTS OF THE INVENTION

Figure 1:
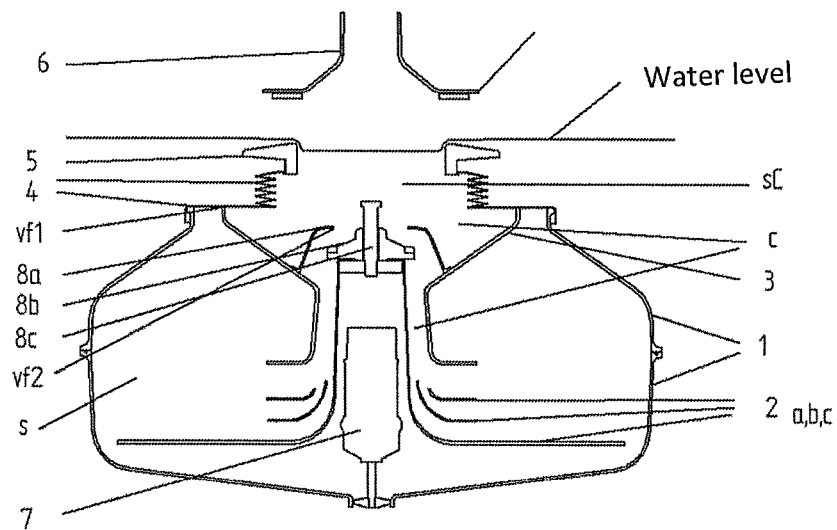

First we refer to FIG. 1 that illustrates a cross-sectional view of a skimming and separation device according to a first embodiment of the present invention. In general the skimming and separation device consist of an outer casing (1) with constructions (not shown) that makes it possible to directly or indirectly fasten all the other parts as e.g. the deflection discs (2a,b,c) and the collecting strut (3) a part of the collecting compartment (C). The overall function, the size and geometrical shape of the device is similar, or the same, as described in the above cited patents.

The top of the separation and storage compartment (S) consists of a rubber membrane and bellow (4) and generates towards the collecting strut a valve function (vf1) and is also referred to as a first valve. The first valve prevents flow in a downward direction, and allows flow in an upward direction. The bellow part of the rubber membrane and bellow (4) creates the sub compartment (sP), see FIGS. 2 and 3, of the collecting compartment (C) and is attached to a floater (5) that creates the skimming function of the device.

A pollution outflow tract (6) can be connected to suitable storage equipment (not shown). The whole system is powered by a power device (7), e.g. an electric motor with a propeller. Depending on the rotation speed of the propeller and the rotation direction various kinds of flow and pressures can be generated to control the in-flow and out-flow of the device.

The parts housing (8a), valve with a sealing ring (8b) and preferably a sliding pin (8c) (not necessary in larger units), create a one way valve function (vf2), which also is referred to as a second valve. The second valve prevents flow in an upward direction, and allows flow in a downward direction.

The second valve will in combination with the other functions in the skimming and separation device generate a simple solution to a large problem. Its function will direct forces to the stored pollutants and thus add energy to the motion of the pollutant when it is by radial compression is transferred to upper collection sub compartment (sC) and further to the pollutant outflow tract (6).

Figure 2:
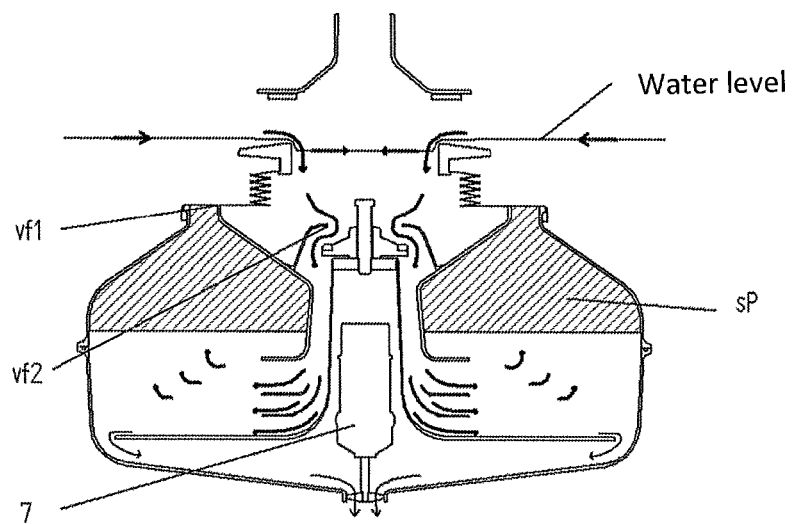

FIG. 2 illustrates a cross-sectional view of a skimming and separation device according to a first embodiment of the present invention, when the device is in a separation phase.

In this phase the power device 7 is creating an under pressure and flow through the device according to the arrows.

The created pressure gradients will close the first valve, i.e. the valve function (vf1), and open the second valve, i.e. the valve function (vf2). The pollutions can start to be separated and stored in the separation and storage compartment (S). Once the pollutant (sP) have reached a certain level, further described in the referred patents the power device (7) will change direction of the propeller and thereby change direction of flow and pressure to empty the pollutant to the pollutant out flow tract (6) see further FIG. 3.

Figure 3:
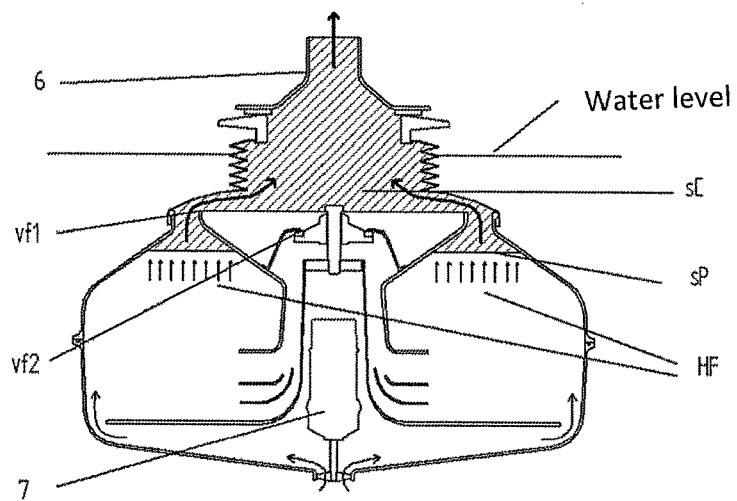

FIG. 3 illustrates a cross-sectional view of a skimming and separation device according to a first embodiment of the present invention, when the device is in an emptying phase.

The power device have now changed the direction of flow and thereby the pressure according to the flow arrows. The pressure gradient will close the second valve, i.e. the valve function (vf2) and open the first valve, i.e. the valve function (vf1). The closed valve function (vf2) will now see to that the pressure that is generated by the power device (7) now will act as a concentrated hydraulic force (HF) acting on the stored pollutant (sP) and actively force it to the collection sub compartment (sC) and further to the pollutant outflow tract (6). With this add of energy there will be enough power to move high viscosity oil and other interacting and obstructing debris.

As stated above the present invention is closely related to U.S. Pat. No. 6,743,358 and U.S. Pat. No. 7,807,059. The improvements according to the present invention, in particular arranging a second valve in order to increase and focus the force acting on the stored pollutant in order to drive it to the collection sub compartment and further to the pollutant outflow tract, is achieved by adapting the previously known solutions in the cited U.S. patents. By including the entire descriptions of those patents the relevant structures of these known devices necessary to implement the present invention are clearly available in the present application, and the subject matter in relation to the present invention may then be readily implemented and combined with the disclosed structure.

In earlier versions of the separating device floating pollutants have been accumulated below the water surface in order to passively move, during the discharge, towards the centre where gravity and flow from the reversed liquid flow force the pollutants into the discharge tube.

The formation close to the periphery of the container has worked very well when the floating pollutants, after inflow over the floater into and down in the container, as the carrying liquid, e.g. water, divert to the outer periphery of the collection container.

In the collection container thicker oil and other pollutants will form larger formations and only contain a less amount of carrying liquid.

When the discharging phase is initiated the reversed liquid flow from the power device (7) will pressurize the content of the separator which results in that the floater will close the connection to the outflow tube and at the same time the valve (vf1) to the peripheral part of the container will be opened. This is illustrated by FIG. 3.

With non-existence of vf2 the accumulated pollutants must during the discharging phase by its own floating capacity converge to the centre of the separator device, i.e. towards the separator space above the valve, as the entire separator device is pressurized.

If the floating capacity is low and the viscosity of the pollutants is high the converging, or movement, of the pollutants be very slow or even completely cease.

The reversed water flow, i.e. the essentially upwardly directed water flow, will take the easiest way through the separation device which is through the centre of the container. This may in its turn prevent the kinetic energy of the water to bring the pollutants.

The present invention relates to two different embodiments.

In both embodiments the inflow and outflow of pollutants into, and out from, the separation device are arranged such that the pollutants are subjected to pressure gradients either of the reversed liquid flow and/or of suction forces applied at the outflow tube of the separator.

The first embodiment is illustrated by FIGS. 1-3. According to this embodiment a valve vf2 is arranged configured to force the reversed liquid flow, or a suction force applied at the discharge tube 6, to generate a pressure gradient. The generated pressure gradient will force the accumulated pollutants located along the periphery of the container in a direction towards the centre of the container and out from the separator through the discharge tube.

FIGS. 4a-13 illustrates a second embodiment of the present invention.

With references to FIG. 4a the basic features of device according to the second embodiment will now be described.

Thus, the skimming and separation device 2 according to the second embodiment comprises an outer casing 1 provided with constructions to directly or indirectly fasten all parts, including a number of inflow tubes 20, and defining a closed container 19.

A floater 5 is provided configured to create the skimming function of the device. The floater is attached at its lower side to an essentially vertically arranged bellow 23 allowing the floater to move from an open lower position allowing flow in a downward direction into the inflow tubes 20. The inflow tube diameters and their numbers are directly related to the flow that normally is flowing over the auto regulating floater. A normal flow through the tubes should be between 0.1-0.2 m/s. In smaller and compact units the ends of the tubes are provided with directed formations (22) to get an even flow in the separator. In this regard, a targeted formation that creates rotation of the liquid in the separator is of a great value, especially in smaller units, and is therefore an important aspect of the second embodiment that is described in the following FIGS. 4b-13).

The floater 5 surrounds a central platform (21) that can contain an out flow tract with a discharge tube (26) that directly or indirectly is connected to a check valve (30). In larger skimming and separation devices the platform may carry a discharge pump (26a) and constitute the system's total float function. When the power device (7) is used to empty the collected debris and/or floating liquids a horizontally arranged plate (21a) is added. The pressure gradient created by the reverse flow of the power device (7) will bring the floater (5) to a closed upper position, where the floater in its contact with the horizontally arranged plate 21, thereby implements a third valve function. The outflow tract with its discharge tube (26) and possibly a discharge pump (26a) can also be arranged inside the separator as shown in FIG. 4a).

The discharge tube 26 or discharge pump (26a) is further adapted to be connected to the device in one end and to a storage equipment (not shown) in its other end.

In FIG. 4b a power device 7, e.g. an electric motor, with a propeller, is arranged, preferably in the lower central part of the container. The power device is controlled by a control unit (not shown), and the power device is configured to be controlled such that various kinds of flows and pressures may be generated to control the in-flow and out-flow of the device according to the same or similar controlling algorithms as in the other embodiments described herein.

The skimming and separation device further comprises a fourth valve 30 arranged in communication with an upper part of the container. The fourth valve is adapted to create a one way valve function, wherein the fourth valve prevents flow into the container and allows flow out from the container to said discharge tube 26.

Each of the inflow tubes 20 comprises an angled lower tube part, a deflection unit, 22 configured to direct the liquid flow of the inflow tube in an essentially outward horizontal direction inside the container, and such that the direction of the liquid flow is in an oblique direction in relation to a vertical wall 27 of the container. All deflection units, e.g. five, are arranged at essentially the same angle v in relation to the wall, e.g. in a direction that is in the range of 20-60 degrees to the separator wall, thereby the liquid flow from all tubes will together generate a rotational movement of water and pollutants within the separation device and in relation to the separation device. This is illustrated by arrows in FIG. 5. In FIG. 4c is schematically shown a cross-sectional view from above through the lower part of the separator device that illustrates the orientation of the lower tube parts and the angular relationship to the separator wall. The angle v is indicated. The inflow tubes (20) can also be placed outside the separator as illustrated by dotted lines in FIGS. 4a and 4c. In this way the inflow volume surrounded by the floater (5) and the bellow (23) can be connected to the volume (19) by a horizontal lower tube part (22) and lead the inflow volume through openings in the vertical peripheral wall (27) in a tangential way as illustrated in FIGS. 4a and 4c. This provides the most optimum rotation of the liquid in the separator but requires more space and may require a more complicated manufacturing process.

Thus, the second embodiment is directed to an alternative arrangement where the collected surface liquid including pollutants is led down into the lower part of the separator device. In this embodiment a predetermined number of vertical inflow tubes 20 are arranged in relation to the floater 5, see e.g. FIG. 4a. The inflow tube diameters and their numbers are directly related to the flow that normally is flowing over the auto regulating floater 5. A normal flow through the tubes should be between 0.1-0.2 m/in smaller units with a floater diameter of 0.6 m. In this example the number of inflow tubes is five.

Tests have shown that this rotational movement will result in that the inflow almost immediately beneath the deflection units (22) will create an even velocity of the entire liquid area surrounded by the casing (1) towards the bottom of the separator and that the discharging motor (at the bottom) will occur essentially along the bottom of the separator. If the floatation velocity is higher than the velocity towards the bottom of the separator separation occurs.

As for the first embodiment the inflow to the separation device may be kept constant by the motor speed and the auto-controlled inflow floater.

According to the second embodiment the floating pollutants will be accumulated in the upper space of the container. The pollutants will be subjected to pressure generated by the reversed flow, or by a suction force generated at the discharge tube. The expelling water generated by reversed flow from the power device (7) will not exit through the inflow tubes as the inflow floater will act as a non-return valve, which is the same function as in the first embodiment.

One further advantage of the second embodiment is that the large volume of water and pollutants in the separation device, especially for larger devices, will prevent the separation device from having a very high net lift power because of a large water volume which is displaced by the separation device.

In the first embodiment the separation device must often be balanced by an external separator stabilising arrangement, e.g. a special floating body, by applying movements to the separation device when the inflow floater delimits the inner lower water surface. In addition these floating bodies must balance the accumulated floating pollutants which, due to its lower density, will try to lift the separator furthermore.

In the second embodiment the trade-off between the air-volume inside the separator, the distance between the floater and the central volume body, where water eventually will be replaced by pollutants in the central volume body, will make it possible to reduce the weight of the separator and no large floating bodies will be required.

More in detail, the separation device is gradually filled up with surface pollutants which will increase its net lift power. However, this gradual increase is counterbalanced by the procedure of filling up the central volume with water/pollutants which will be moved up above the water surface and rapidly and efficiently counteract the occurrence that the separator device will float higher in an uncontrollable way.

The second embodiment will enable smaller and lighter separation devices provided only with smaller floating bodies essentially only for stabilising purposes. This smaller device may function as an active suction mouthpiece adapted to locally separate the surface pollutants from the water surface.

According to one version of the second embodiment the separation device is arranged to separate surface sludge in a waste water purifying plant. The outflow of the carrying substance, i.e. the water, through the separation device is connected to a floating connection on the water surface that together with the weight of the separation device form the required sealing needed to provide the water flow through the separation device may be used to flush surface foam towards the inflow opening of the separator.

The control of function is accomplished by a control program using specified input parameters, e.g. time, rotation speed of the motor, current and voltage in different operation situations.

For example, it is possible to determine at a very high accuracy (approximately 3 mm) the level of a water column in the discharge tube, which e.g. implies that it is possible to prevent water from escaping through an opening. On the other hand, debris having a lower density than water may flow out through the opening, which is very effective.

Now FIGS. 4*b*-13 will be discussed.

FIG. 4*b* is a cross-sectional view of a separation device according to the second embodiment, during a preparation phase where the device is gradually filled up with water and air is forced to escape from the central accumulation space through the fourth valve 30 and out via the discharge tube. In this phase the power device 7 generates an inflow of water resulting in that the air is forced to escape.

The separation device will at the end of this phase lie very stable in the water. The water above the fourth valve 30 will apply a pressure on the valve thereby closing it.

FIG. 5 is a cross-sectional view of a separation device according to the second embodiment, during start of a pollutants collection phase.

In this phase the power device 7 has change direction of the flow and now instead water is flowing out of the separation device resulting in that the third valve, embodied by the floater 5 and the plate 21*a*, will open allowing water including pollutants to be sucked into the device via the vertical inlet tubes 20. Due to the angled shape of the lower part of the inlet tubes 20 a rotation of the water/pollutants in the lower part will occur, which is illustrated by arrows in FIG. 5. The flow velocities are chosen and determined approximately as in the other embodiments.

FIG. 6 is a cross-sectional view of a separator device according to the second embodiment, during the pollutants collection phase.

The power device has the same direction as in FIG. 5 and the pollutants (checked in the figure) have now filled up the upper half of the separation device.

FIG. 7 is a cross-sectional view of a separation device according to the second embodiment, during a pollutants discharging phase. The power device has now changed direction of the flow and an inflow into the lower part of water will generate pressure upwards on the accumulated pollutants, which is illustrated by the vertical arrows. The floater will close and thereby prevent back-flow into the inlet tubes 20. The fourth valve 30 will open due to the upward directed pressure and pollutants will be forced out through the discharge tube 26.

FIG. 8 is a cross-sectional view of a separation device according to the second embodiment, during a combined collection and discharging phase. In this phase the power device has a direction such that water is flowing out, which, as in the pollutants collection phase (FIG. 6) will result in that water/pollutants enters the separator device via the inlet tubes. At the same time a suction equipment (not shown) is connected to the discharge tube 26 that applies a suction force which will result in the pollutants are sucked out from the separation device. When external suction or discharge pumps (26*a*) are used, see FIG. 4*a*, the third valve function and the horizontally arranged plate (21*a*) are not required. The motor speed of the power device and the suction force applied by the suction equipment must of course be related to each other such that a desired balance is obtained, i.e. such that the inflow essentially corresponds to the outflow.

FIG. 9 is a cross-sectional view of a separation device according to a variation of the second embodiment, during the discharging phase.

According to the embodiment illustrated in FIG. 9 an insert 40 is arranged in the central upper part of the separator device. The purpose of arranging the insert is to prevent that water canals are formed through the accumulated pollutants which might occur when slow-floating substances have accumulated and should be discharged. By arranging the insert 40 the water is forced to follow the outer periphery of the container which is advantageous. The insert has an essentially cylindrical shape having a circular cross-section. The upper part widens in order to make the stored pollutants beneath the widening of the insert to be able to diverge and prevent that water canals are formed through the accumulated pollutants.

The lower part of the insert 40 is configured such that the insert is mounted on the upper part of the power device 7.

FIG. 10 is a cross-sectional view of a separation device according to another variation of the second embodiment, during the discharging phase. According to this variation the discharge tube 26 exits the separator device through a side wall 42. The fourth valve 30 has the same function, i.e. to allow flow when discharging is performed. This variation is applicable for smaller separation devices.

FIG. 11 is a cross-sectional view of a separation device according to still another variation of the second embodiment, during a combined collection and discharging phase. In FIG. 11 the discharge tube, as in FIG. 10, exits through the side wall of the separator device. A suction equipment is connected to the discharge tube 26 and a suction force is applied which will result in that accumulated pollutants is withdrawn from the separator device. At the same time the power device 7 generates an outflow resulting in that water/pollutants is collected and enters the device via the inflow tubes 20. When external suction or discharge pumps (26a) are used, FIG. 4a, the third valve function and the horizontally arranged plate (21a) are not required.

FIGS. 12 and 13 show cross-sectional views of the separation device according to still another variation of the second embodiment.

According to this variation a number of movable clutches 50, e.g. 2-3, are arranged at the plate. The clutches 50 may be automatically or manually operated.

In FIG. 12 the separation device is shown during a rinsing procedure. The clutches are in their active positions (illustrated by solid lines; the passive positions are illustrated by dashed lines) where they prevent the floater 5 from closing against the plate 21. By applying a heavy inflow the inlet tubes may be rinsed. The third valve is closed e.g. due to the pressure from the water above the valve.

In FIG. 13 the clutches are in their active positions locking the floater with a smaller distance to the plate. In this way, an air gap between the plate (21a) and the floater (5) is achieved allow air to enter into the separation device. In this figure the power device generates an outflow of water and the separation device is gradually filled up with air.

FIG. 14 is a schematic illustration of a waste water purifying plant comprising two separation devices (Sd) according to the first or second embodiment of the present invention that are arranged to separate surface sludge in the waste water purifying plant. The energy in the outflow of the carrying liquid, i.e. the water, generated by the power device (7)(not shown) through the separation devices can be taken care of to force floating debris to the intake of the separation devices. That is achieved by adapting the outflow of water from the power device to a floating connection with a valve (not shown), that on the water surface together with the weight of the separation device forms the required sealing that is needed to transfer the water flow through the separation device to a pipe arrangement (Pa) that by nozzles (Nz) flushes surface foam towards the inflow openings of the separators. The valve in the floating connection is arranged to allow surrounding water to enter into the system when the power unit is used to empty the pollutant in the separator. The discharge tubes 26 are connected to a common vessel for further transportation to larger storing vessels.

The present invention is not limited to the above-described preferred embodiments. Various alternatives, modifications and equivalents may be used. The inflow pipes can for example run outside the separator as discussed above (FIGS. 4a, 4c). This provides the most optimum rotation of the liquid in the separator but requires more space and may require a more complicated manufacturing process. Therefore, the above embodiments should not be taken as limiting the scope of the invention, which is defined by the appending claims.

The invention claimed is:

1. A skimming and separation device comprising
an outer casing defining a closed container,
a floater configured to create the skimming function of the device, the floater is attached at a lower side to an essentially vertically arranged bellow allowing the floater to control flow into a substantially circum volume that is allowing flow in a downward direction into inflow tubes having inlets opening to the substantially circum volume and extending into the container, the inflow tubes allowing debris and floating pollutions to enter below the, in the container, accumulated debris and floating pollutions,
a discharge tube adapted to be connected to a storage equipment,
a power device having a propeller controlled by a control unit, wherein said power device is configured to be controlled such that various kinds of flows and pressures may be generated to control an in-flow and an out-flow of the device,
wherein the skimming and separation device further comprises one of a valve or a discharge pump arranged in communication with the discharge tube, the valve or discharge pump is adapted to create a one way valve function such that the valve or the discharge pump prevents reverse flow through the discharge tube into the container and allows flow out from the container through the discharge tube, and such that active pressure gradients generated either by the power device or by suction in a discharge zone upstream of the discharge tube are acting onto the collected floating pollutions;
wherein each of the inflow tubes includes an angled tube part at a lower end of the inflow tubes within the container, the angled tube parts configured to direct the liquid flow of the inflow tubes into the container in an essentially outward horizontal direction inside the container, such that the direction of the liquid flow is in an oblique or tangential direction in relation to a vertical wall of the container, the angled tube parts configured such that a combined flow from each of the inflow tubes together generates a rotational movement of water and pollutants inside the skimming and separation device; and
wherein said device further comprises an insert configured to be arranged at a central portion of the container, the insert having an essentially cylindrical shape having a circular cross-section and having an upper part having a larger external periphery than a lower part of the insert, enabling the pollutants to diverge and restricting formation of water canals through the accumulated pollutants.

2. The skimming and separation device according to claim 1, wherein said discharge tube is configured to be connected to the discharge pump where the skimming and separation device includes the discharge pump, to apply a suction force to the tube for removing pollutant from said container.

3. The skimming and separation device according to claim 2, where the discharge pump is disposed external to or internal to the container.

4. The skimming and separation device according to claim 1, wherein said device is adapted to be in a combined collection and discharging mode, enabling simultaneous collection of pollutant and discharging of accumulated pollutant.

5. The skimming and separation device according to claim 1, wherein the discharge tube is arranged at an upper end of the skimming and separation device.

6. The skimming and separation device according to claim 1, wherein the discharge tube exits the separation device through a side wall.

7. The skimming and separation device according to claim 1, wherein said skimming and separation device is adapted to be in a separation phase, wherein said control unit is adapted to control said power device to drive the propeller in a first direction in order to create an under pressure and downward directed flow through the skimming and separation device, said created pressure gradients will open another valve, wherein the pollutants will start to be separated and stored in the container.

8. The skimming and separation device according to claim 1, wherein when the pollutions have reached a certain level, said power device will change direction of the propeller setting the skimming and separation device in an emptying phase and thereby change direction of flow and pressure to empty the pollutions to the discharge tube.

9. The skimming and separation device according to claim 8, wherein in the emptying phase, where the skimming and separation device includes the valve, the power device has now changed the direction of flow to an essentially upward direction, enabling the pressure gradient to close the another valve and enabling opening of the valve, wherein the closed another valve enables pressure that is generated by the power device to act as a force acting on the stored pollutions in the container to force the pollutions to the discharge tube.

10. A waste water purifying plant comprising at least one skimming and separation device according to claim 1, wherein said at least one separation device is connected to a pipe arrangement and a nozzle system configured to use the energy that is generated by the power device when discharging water.

* * * * *